US010764403B1

(12) United States Patent
Kulkarni et al.

(10) Patent No.: US 10,764,403 B1
(45) Date of Patent: Sep. 1, 2020

(54) METHOD AND APPARATUS FOR CLIENT CONFIGURATION AND UTILIZATION-AWARE ADAPTIVE SERVER-SIDE RENDERING

(71) Applicant: DELL PRODUCTS, LP, Round Rock, TX (US)

(72) Inventors: Yogesh P. Kulkarni, Round Rock, TX (US); Ravishankar Kanakapura Nanjundaswamy, Bangalore (IN); Smruti Ranjan Debata, Jaipur (IN); Harshendra Shetty, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/370,938

(22) Filed: Mar. 30, 2019

(51) Int. Cl.
*H04L 29/06* (2006.01)
*H04L 29/08* (2006.01)

(52) U.S. Cl.
CPC ............ *H04L 67/42* (2013.01); *H04L 67/303* (2013.01); *H04L 67/32* (2013.01)

(58) Field of Classification Search
CPC .............................. H04L 67/08; H04L 67/42
See application file for complete search history.

(56) References Cited

U.S. PATENT DOCUMENTS

| 9,411,903 | B2 | 8/2016 | Helfman et al. |
| 2009/0129378 | A1 | 5/2009 | Pagan |
| 2016/0364498 | A1 | 12/2016 | Greene et al. |

*Primary Examiner* — Shean Tokuta
(74) *Attorney, Agent, or Firm* — Larson Newman, LLP (57) ABSTRACT

An information handling system includes a network interface configured to be coupled to a client device over a network, and a processor configured to receive a report of client capabilities pertinent to client rendering at the client device received from the client device via the network interface. The processor is also configured to assign a client resource rating to the client device from among a predefined plurality of client resource ratings, to store the client resource rating of the client device and an identifier of the client device in a data structure in the memory, to look up the client resource rating of the client device in the data structure, to transform content to be provided to the client device into server-side rendering transformed content according to the client resource rating of the client device, and to provide the SSR transformed content to the client device via the network interface.

20 Claims, 10 Drawing Sheets

METHOD AND APPARATUS FOR CLIENT CONFIGURATION AND UTILIZATION-AWARE ADAPTIVE SERVER-SIDE RENDERING

FIELD OF THE DISCLOSURE

The present disclosure generally relates to information handling systems, and more particularly relates to server-side rendering in relation to an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a network interface configured to be coupled to a client device over a network, and a processor configured to receive a report of client capabilities pertinent to client rendering at the client device received from the client device via the network interface. The processor may also assign a client resource rating to the client device from among a pre-defined plurality of client resource ratings, store the client resource rating of the client device and an identifier of the client device in a data structure in the memory, look up the client resource rating of the client device in the data structure, transform content to be provided to the client device into server-side rendering transformed content according to the client resource rating of the client device, and provide the SSR transformed content to the client device via the network interface.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
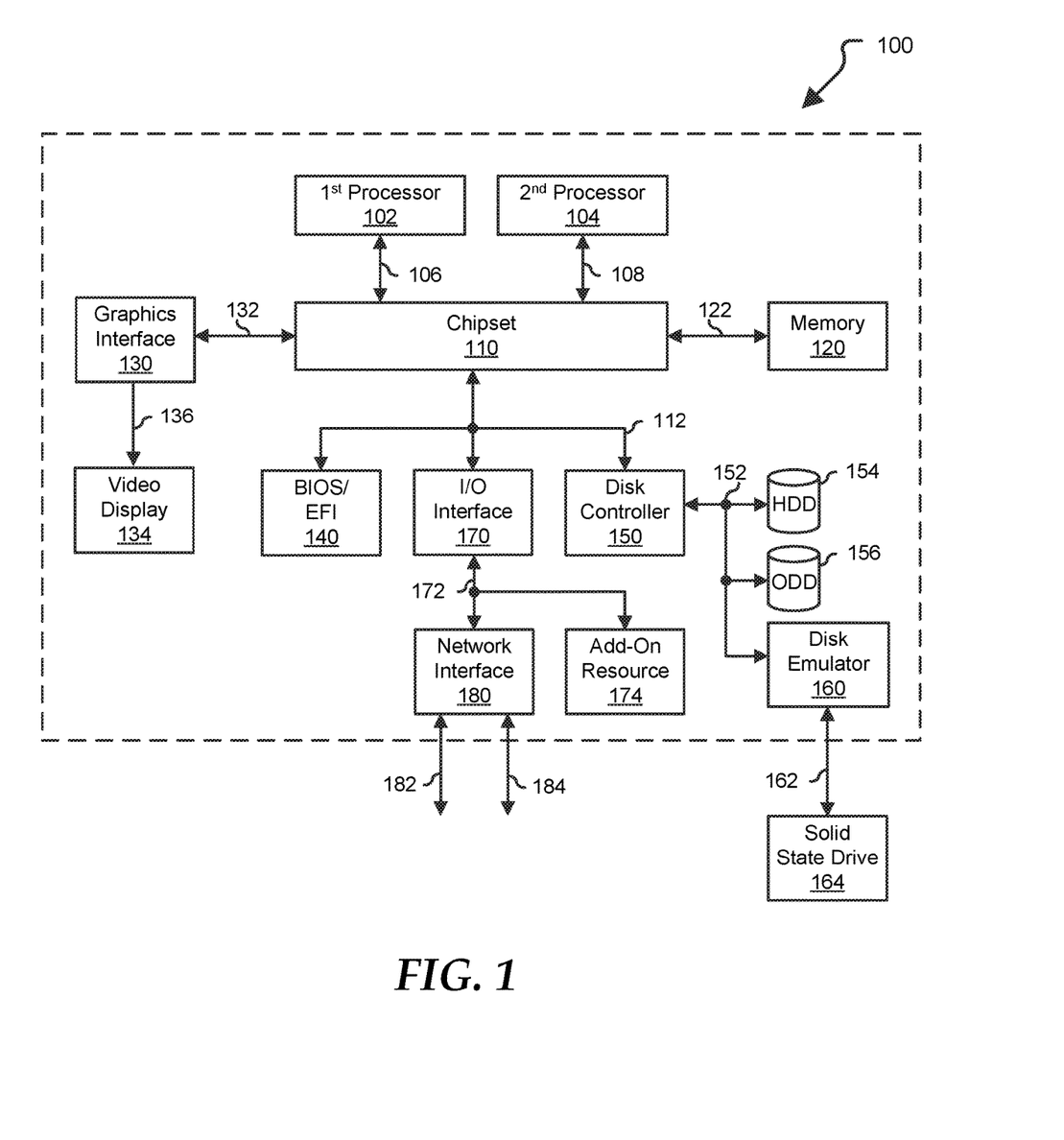
FIG. 1 is a block diagram illustrating an information handling system according to an embodiment of the present disclosure.

FIG. 1 shows a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
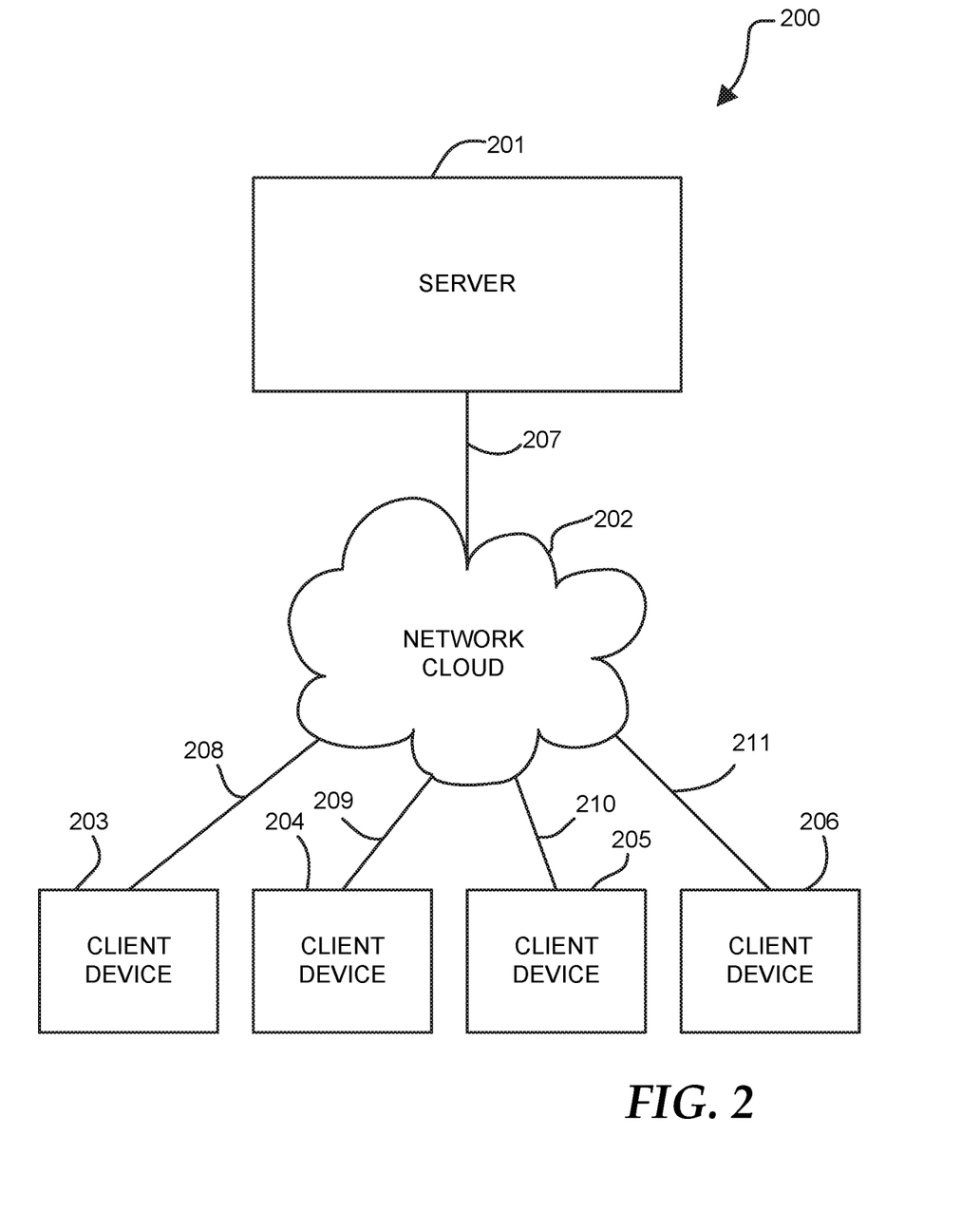
FIG. 2 is a block diagram illustrating a network including at least one information handling system according to an embodiment of the present disclosure.

FIG. 2 shows a block diagram illustrating a network comprising at least one information handling system according to an embodiment of the present disclosure. System 200 comprises a server 201, a network cloud 202, and a plurality of client devices 203, 204, 205, and 206. Server 201 is connected to network cloud 202 via interconnection 207. Network cloud 202 is connected to client device 203 via interconnection 208. Network cloud 202 is connected to client device 204 via interconnection 209. Network cloud 202 is connected to client device 205 via interconnection 210. Network cloud 202 is connected to client device 206 via interconnection 211. One or more instances of information handling system 100 of FIG. 1 may be used to implement one or more of server 201 and one or more of client devices 203, 204, 205, and 206.

Modern enterprise applications and services which have a client-server architecture of request processing (such as hosted in private or public, in a data center and cloud environment as dedicated or micro-service/container-based) can benefit from improvements disclosed herein, which can overcome deficiencies of traditional approaches. Services and web-application hosts have been generally unawareness of client-side infrastructures and configurations for response rendering (such as browser allocated memory, browser features and capabilities, CPU, current load/client memory, CPU, 10 utilization, etc.). Browser intensive applications (having verbose response or large data or binary) have often needed a substantial amount of computation cycles on the client side for HTML transformation of response data (such as JavaScript Object Notation (JSON), extensible markup language (XML), binary, etc.) by using client-side scripting engines (JavaScript (JS), jQuery, Visual Basic (VB), Angular, etc.), which can yield significant delay in user interface (UI) rendering. The number of UI components for a hypertext markup language (HTML) page is generally directly proportional to its response time in rendering. On the server side, there typically has been no validation with respect to types of application applicability for its clients in order to render in UI. For example, Open/Web-GL graphics applications meant for high configuration clients have been rendered unsatisfactorily on low-end-configuration clients/very thin clients, etc., which are better suited to receive a plain text response (e.g., one of <5 kilobytes (KB)). There has been a lack of differentiation on rendering load on client devices if the same user is logged into a web-application or service using multiple client devices (e.g., tablets/handhelds, smartphone, workstation, etc.), which may have had uneven hardware configurations and computing capabilities.

In accordance with at least one embodiment, application rendering capabilities and performance can be improved by applying an adaptive server side rendering (SSR) scheme at runtime for a web-application and services while measuring, for a client device of the web-application and services, client capabilities on a rated scale, where each number on the rated scale is determined based on one or more types of resource available on client which is participating in request-response mode of communication to optimize application performance and speed up its rendering process.

Figure 3:
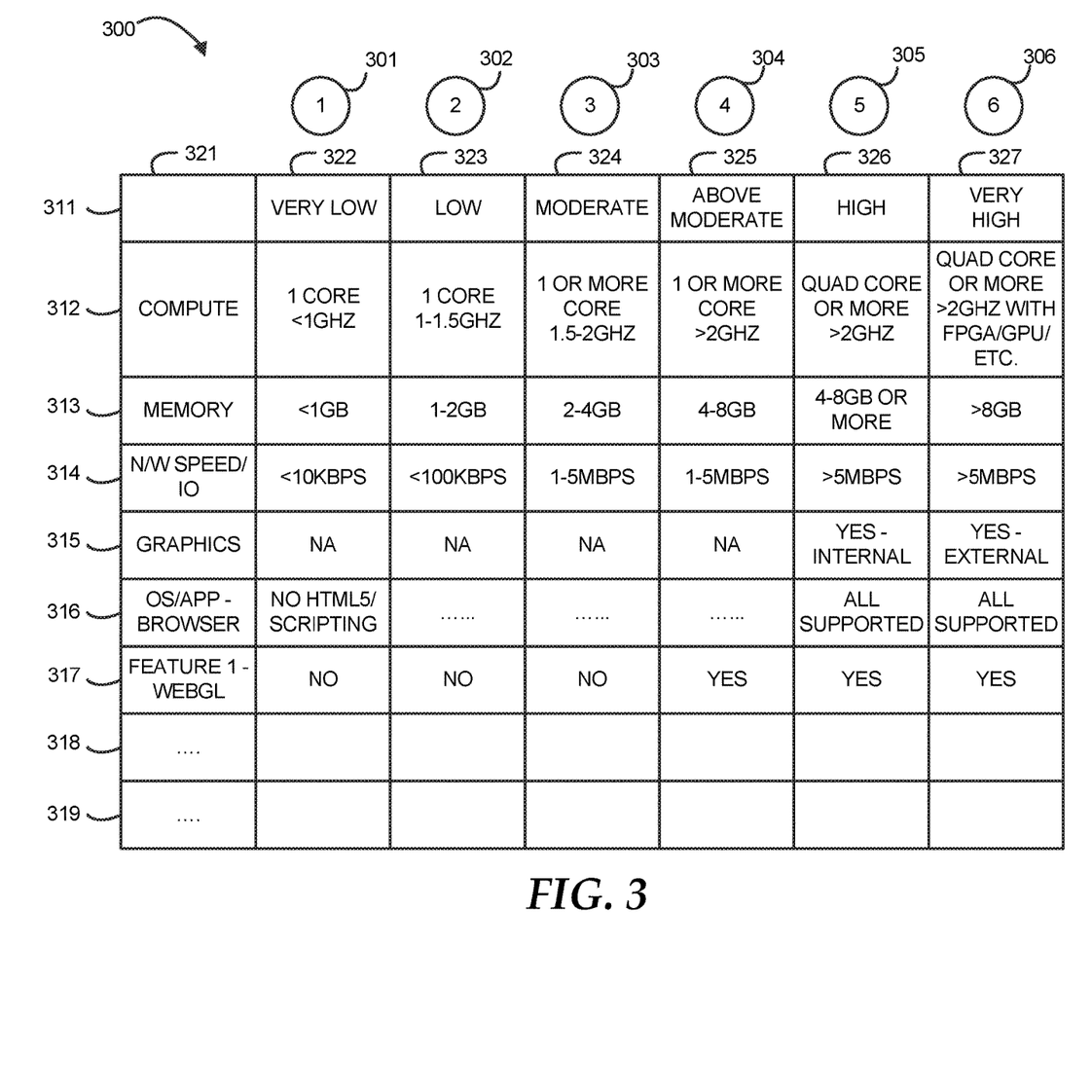
FIG. 3 is a tabular diagram illustrating client resource ratings according to an embodiment of the present disclosure.

FIG. 3 shows a tabular diagram illustrating a plurality of client resource ratings according to an embodiment of the present disclosure. The tabular diagram illustrates an exemplary six-value scale representation and the corresponding client configuration and rendering capabilities for each of the values. Table 300 is organized as a plurality of rows 311-319 and a plurality of columns 321-327, with each of the plurality of client resource ratings 301-306 corresponding to respective ones of the columns 322-327. Row 311 sets forth performance level descriptions, each corresponding to a respective client resource rating of the plurality of client resource ratings 301-306. A "very low" performance client device in column 322 is assigned a corresponding client resource rating 301 equal to one. A "low" performance client device in column 323 is assigned a corresponding client resource rating 302 equal to two. A "moderate" performance client device in column 324 is assigned a corresponding client resource rating 303 equal to three. An "above moderate" performance client device in column 325 is assigned a corresponding client resource rating 304 equal to four. A "high" performance client device in column 326 is assigned a corresponding client resource rating 305 equal to five. A "very high" performance client device in column 327 is assigned a corresponding client resource rating 306 equal to six.

Row 312 sets forth a computational capability attribute, such as a processor type. A client device with a single-core processor with a rate less than 1 gigahertz (GHz), as in column 322, may be given a client resource rating 301 equal to one. A client device with a single-core processor with a rate of 1 to 1.5 GHz, as in column 323, may be given a client resource rating 302 equal to two. A client device with a processor having one or more cores at a rate of 1.5 to 2 GHz, as in column 324, may be given a client resource rating 303 equal to three. A client device with a processor having one or more cores at a rate of greater than 2 GHz, as in column 325, may be given a client resource rating 304 equal to four. A client device with a quad-core processor at a rate of greater than 2 GHz, as in column 325, may be given a client resource rating 305 equal to five. A client device with a quad-core processor at a rate of greater than 2 GHz with a field-programmable gate array (FPGA), a graphics processing unit (GPU), or the like, as in column 326, may be given a client resource rating 306 equal to six.

Row 313 sets forth a memory capacity attribute. A client device with less than one gigabyte (GB) of memory, as in column 322, may be given a client resource rating 301 equal to one. A client device with 1 to 2 GB of memory, as in column 323, may be given a client resource rating 302 equal to two. A client device with 2 to 4 GB of memory, as in column 324, may be given a client resource rating 303 equal to three. A client device with 4 to 8 GB of memory, as in column 325, may be given a client resource rating 304 equal to four. A client device with 4 to 8 GB or more of memory, as in column 326, may be given a client resource rating 305 of five. A client device with more than 8 GB of memory, as in column 327, may be given a client resource rating of six.

Row 314 sets forth a network speed or input-output (TO) capacity attribute. A client device with a network speed of less than 10 kilobits per second (KBPS), as in column 322, may be given a client resource rating 301 equal to one. A client device with a network speed of less than 100 KBPS, as in column 323, may be given a client resource rating 302 equal to two. A client device with a network speed of 1 to 5 megabits per second (MBPS), as in column 324, may be given a client resource rating 303 equal to three. A client device with a network speed of 1 to 5 MBPS, as in column 325, may be given a client resource rating 304 equal to four. A client device with a network speed of greater than 5 MBPS, as in column 326, may be given a client resource rating 305 equal to five. A client device with a network speed of greater than 5 MBPS, as in column 327, may be given a client resource rating 306 equal to six.

Row 315 sets forth a graphics capability attribute. A client device without a significant graphics capability, as in any of columns 322 through 325, may be given a client resource rating from one to four, depending on other criteria, as described herein. A client device with an internal graphics capability, as in column 326, may be given a client resource rating 305 equal to five. A client device with an external graphics capability, as in column 327, may be given a client resource rating 306 equal to six.

Row 316 sets forth an operating system (OS) and application software, e.g., browser, capability attribute. A client device with no hypertext markup language version 5 (HTML5) capability and with no script language execution capability, as in column 322, may be given a client resource rating 301 equal to one. Client resource ratings 302 through 304, equal to two through four, respectively, can be assigned without specific reliance on an OS and application software capability attribute. A client device with full support for HTML5 and script language execution, as in either of columns 326 and 327, may be given a client resource rating 305 equal to five or a client resource rating 306 equal to six, as may be determined according to other criteria, as described herein.

Row 317 sets forth a feature capability attribute for a feature capability, such as a capability of a client device to support use of Web Graphics Library (WebGL). WebGL is a JavaScript API that enables a web browser to provide interactive two-dimensional (2D) or three-dimensional (3D) graphics without requiring a plug-in to be installed in the web browser specifically to support graphics. A client device that does not support WebGL, as in any of columns 322 through 324, may be given one of client resource ratings 301 to 303, equal to one, two, or three, respectively, as may be determined according to other criteria, as described herein. A client device that does support WebGL, as in any of columns 325 through 327, may be given one of client resource ratings 304 to 306, equal to four, five, or six, respectively, as may be determined according to other criteria, as described herein.

Rows 318 and 319 represent the possible existence of one or more additional rows setting forth one or more additional attributes of a client device that can be used to determine a client resource rating among client resource ratings 301 through 306, having respective values from one to six. In a case where a client device may possess one or more attribute values for one client resource rating but may lack one or more other attribute values for that one client resource rating, an arbiter may be provided to determine whether to classify the client device as having that one client resource rating or a different client resource rating. In a case where a client device may possess one or more attribute values for one client resource rating but may possess one or more attribute values for one other client resource rating, an arbiter may be provided to determine whether to classify the client device as having the one client resource rating or the one other client resource rating. As an example, an arbiter may make a determination based on a simple majority of applicable attribute values. As another example, an arbiter may make a determination based on a weighted comparison of the attribute values, where one or more attributes or attribute values may take precedence, to at least some degree, over one or more other attributes or attribute values in making a determination. As yet another example, an arbiter may make a determination based on conditional logic, such as a requirement that one or more attribute values be possessed or that one or more attribute values be absent. As a further example, an arbiter may make a determination based on a combination of the foregoing examples, such as a requirement that one or more attribute values be present or absent combined with a weighted comparison of the remaining attribute values.

Figure 4:
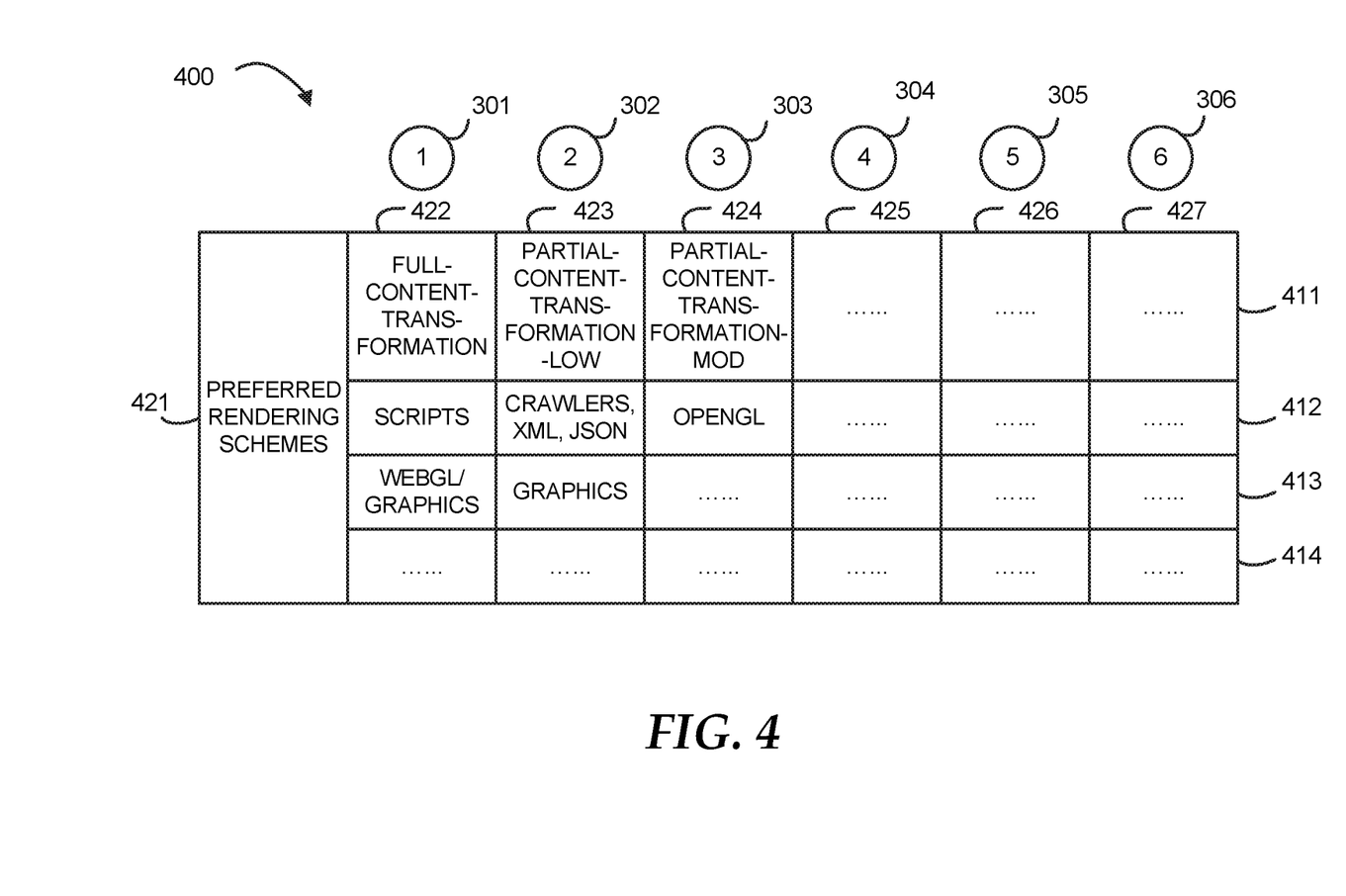
FIG. 4 is a tabular diagram illustrating preferred rendering schemes for at least a portion of the client resource ratings according to an embodiment of the present disclosure.

FIG. 4 shows a tabular diagram illustrating preferred rendering schemes for at least a portion of the client resource ratings according to an embodiment of the present disclosure. Sample preferred rendering schemes can be mapped to respective ones of a plurality of client resource types to perform SSR action for clients. Table 400 is organized as a plurality of rows 411-414 and a plurality of columns 421-427, with each of the plurality of client resource ratings 301-306 corresponding to respective ones of the columns 422-427. Column 421 collectively characterizes the feature values set forth in columns 422-427 for respective client resource ratings 301-306 as preferred rendering schemes for those client resource ratings.

Row 411 sets forth a description of the transformation of the content to be provided by a server to a client device in communication with the server. In column 422, for client resource rating 301 equal to one, a full content transformation is to be performed. In column 423, for client resource rating 302 equal to two, a partial content transformation for a "low" performance client device is to be performed. In column 424, for client resource rating 303 equal to three, a partial content transformation for a "moderate" performance client device is to be performed. In columns 425, 426, and 427, for client resource ratings 304, 305, and 306, respectively, equal to four, five, and six, respectively, no transformation is specified, as higher performance client devices may be capable of satisfactorily processing and presenting content in its original form without transformation.

Row 412 sets forth attributes of content transformation. In column 422, for client resource rating 301 equal to one, a scripting language is used as part of a preferred rendering scheme. In column 423, for client resource rating 302 equal to two, crawlers, extensible markup language (XML), and JavaScript Object Notation (JSON) are used as parts of a preferred rendering scheme. In column 424, for client resource rating 303 equal to three, Open Graphics Library (OpenGL) is used as a part of a preferred rendering scheme.

Row 413 sets forth attributes of graphics presentation transformation. In column 422, for client resource rating 301 equal to one, WebGL and graphics are used as part of a preferred rendering scheme. In column 423, for client resource rating 302 equal to two, graphics are used as part of a preferred rendering scheme. In column 424, for client resource rating 303 equal to three, as well as all of rows 414 and columns 425, 426, and 427, the absence of entries is used to indicate that transformation is not needed under the specified circumstances.

Figure 5:
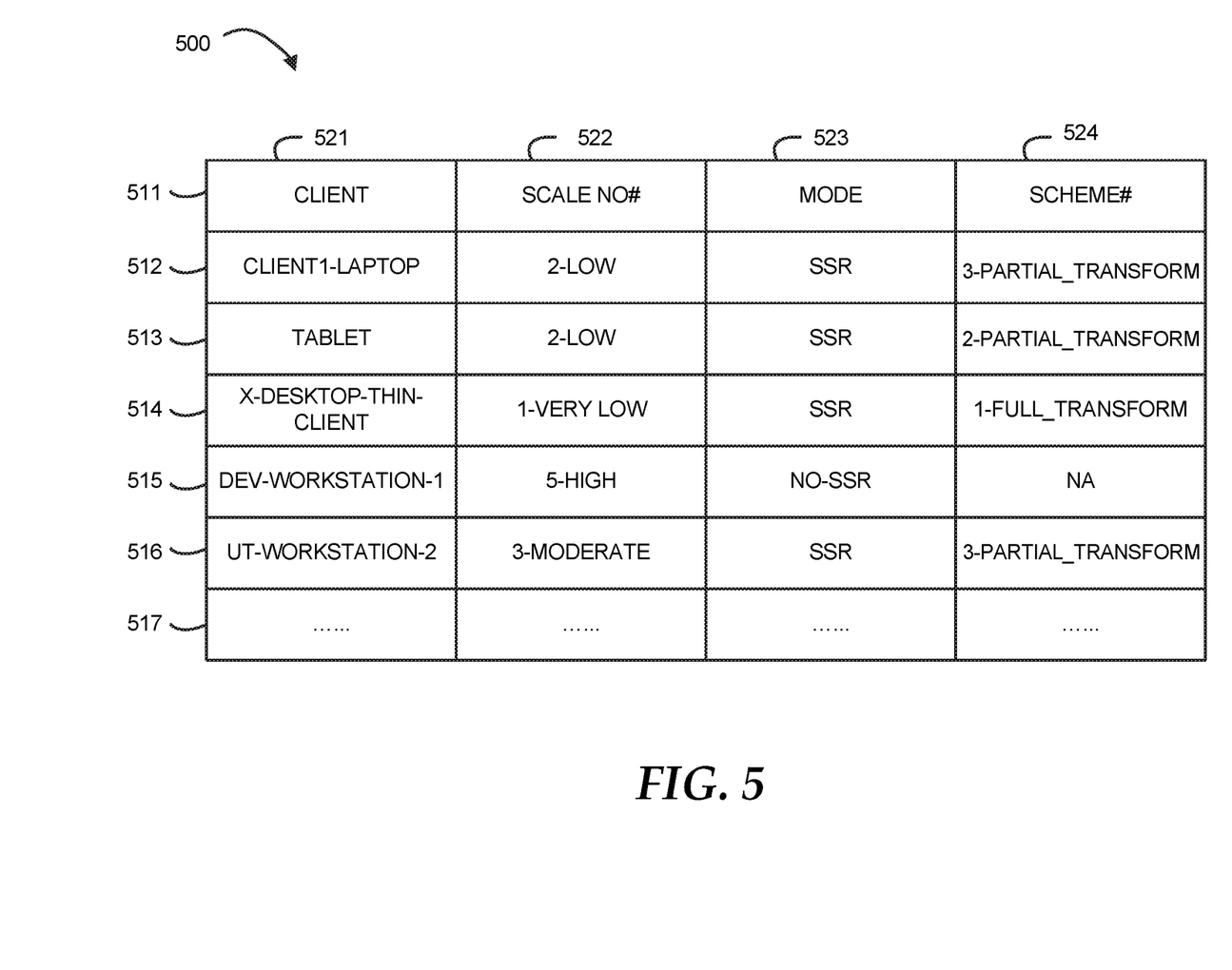
FIG. 5 is tabular diagram illustrating a session map for client devices and their corresponding rendering schemes according to an embodiment of the present disclosure.

FIG. 5 shows tabular diagram illustrating a session map for client device and their corresponding rendering schemes according to an embodiment of the present disclosure. Table 500 is organized as a plurality of rows 511-317 and a plurality of columns 521-524. Row 511 sets forth headings for the content of columns 521, 522, 523, and 524. The heading of column 521 describes the information below in column 521 as being client device identities of client devices. The heading of column 522 describes the information below in column 522 as being the client resource rating value of the respective client device. The heading of column 523 describes the information below in column 523 as being a mode of operation for providing information to the respective client device (e.g., using server-side rendering (SSR) or not using server-side rendering (no-SSR). The heading of column 524 describes the preferred rendering scheme to be used for the respective client device.

Row 512 identifies a client device as being a "clientl-laptop" having a resource rating value of two ("low"), to operate using SSR, with a partial transformation to be used to accommodate it. Row 513 identifies a client device as being a "tablet" having a resource rating value of two ("low"), to operate using SSR, with a partial transformation corresponding to its "low" performance used to accommodate it. Row 514 identifies a client device as being "x-desktop-thin-client" having a resource rating value of one ("very low"), to operate using SSR, with a full transformation to be used to accommodate it. Row 515 identifies a client device as being "dev-workstation-1" having a resource rating value of five ("high"), to operate using no SSR, with no transformation. Row 516 identifies a client device as being "ut-workstation-2" having a resource rating value of three ("moderate"), to operate using SSR, with a partial transformation corresponding to its "moderate" performance used to accommodate it.

In accordance with at least one embodiment, an information handling system or method creating and utilizing a data structure, such as at least one of the data structures illustrated in FIGS. 3-5, can improve performance of a server-side rendering (SSR) for one or more client devices. Such a data structure can be stored in a memory of an information handling system, improving the performance of the information handling system.

In accordance with at least one embodiment, various methods, which may, for example, be implemented alone or in combination, such as in a method and sub-method relationship, to identify, with respect to each unique client device, a client resource type and to adaptively perform Server Side Rendering (SSR), which may be done in a seamless manner, as described below with respect to FIGS. 6-10.

Figure 6:
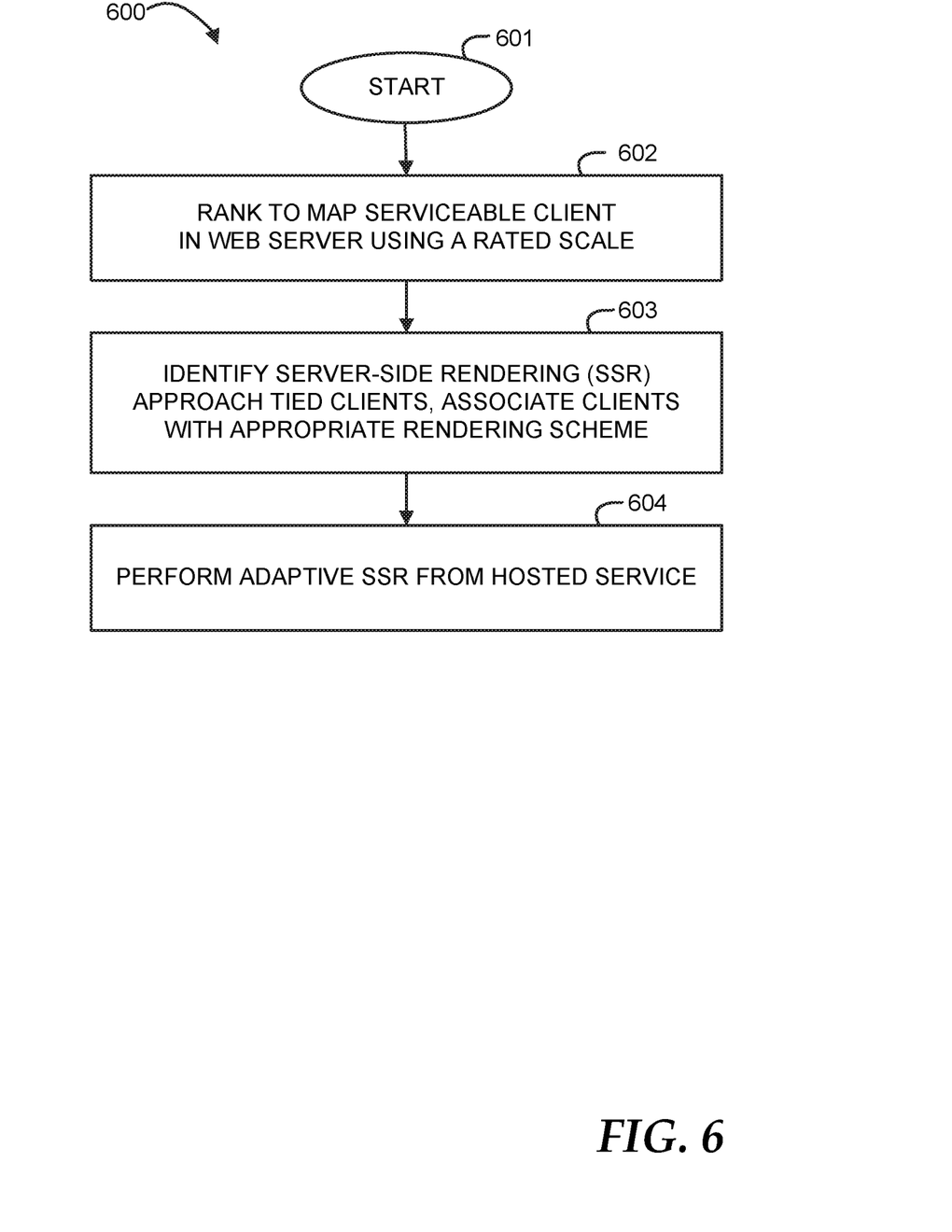
FIG. 6 is a flow diagram illustrating a method according to an embodiment of the present disclosure.

FIG. 6 shows a method according to an embodiment of the present disclosure. Method 600 begins at block 601 and continues to block 602. At block 602, a serviceable client device is mapped in a webserver using a rated scale according to client configuration and rendering capabilities of the client device. From block 602, method 600 continues to block 603. At block 603, clients having a designated SSR approach mapped to them are identified, and an appropriate rendering scheme is associated with each corresponding one of such clients. From block 603, method 600 continues to block 604. At block 604, adaptive SSR is performed from a hosted service at the webserver according to the associated rendering scheme.

Figure 7:
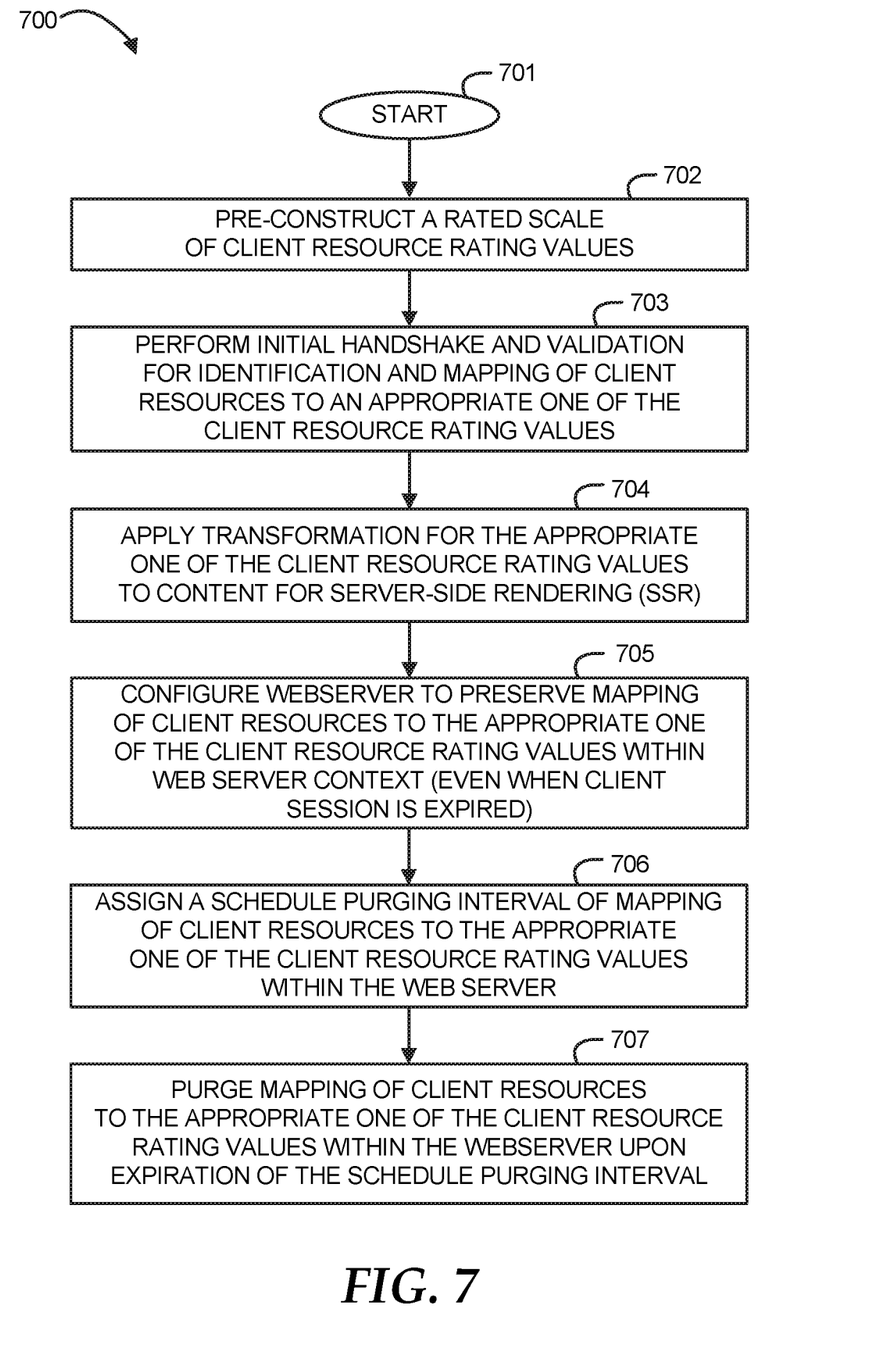
FIG. 7 is a flow diagram illustrating a sub-method for implementing block 602 of method 600 according to an embodiment of the present disclosure.

FIG. 7 shows a sub-method for implementing block 602 of method 600 according to an embodiment of the present disclosure. Method 700 begins at block 701 and continues to block 702. At block 702, a rated scale of client resource rating values is pre-constructed at a webserver prior to receipt of client requests to be handled using adaptive SSR. Such pre-construction can provide a ranking to map in a webserver using a rated scale a serviceable client according to its attributes that can affect its ability to render content provided to it by the webserver. A processor running a hosted web application service can pre-construct such a rated scale (e.g., a six-point rated scale) based on clients' resource types, and such pre-construction can occur before service initiation (e.g., startup) of the webserver. A rating scale can have various resource types defined in combination with increasing order of resource attributes (e.g., compute, memory, network, operating system (OS)/application software (app), and its feature capabilities, etc.). The rating scale can be configurable based on service offerings from webserver context.

Figure 8:
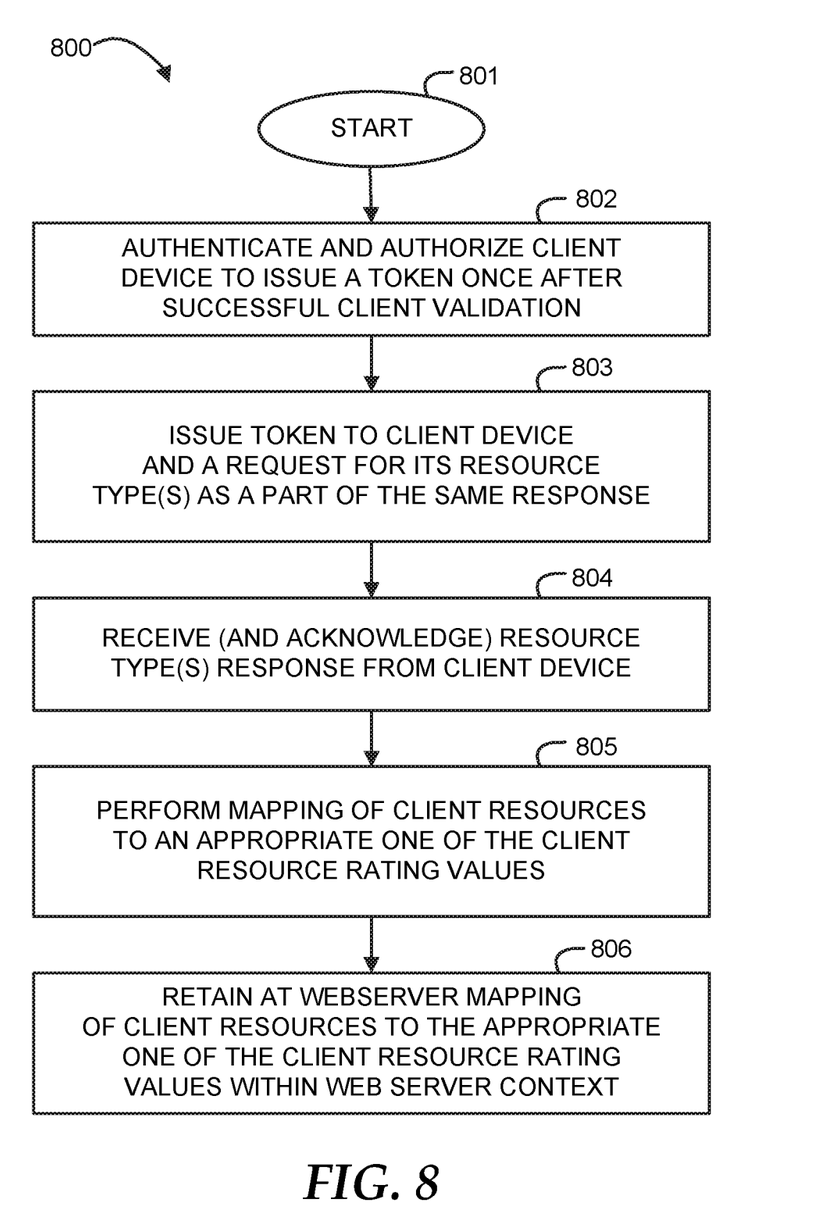
FIG. 8 is a flow diagram illustrating a sub-method for implementing block 703 of method 700 according to an embodiment of the present disclosure.

From block 702, method 700 continues to block 703. At block 703, a webserver performs an initial handshake and validation for identification and mapping of client resources to an appropriate one of the client resource rating values. As part of initial handshake and validation steps for identification and mapping of client to one of the numbers in the defined rated scale, a webserver may, for example, perform a sub-method as shown in FIG. 8, which is described further below. From block 703, method 700 continues to block 704. At block 704, the webserver applies a transformation of content to be provided to the client device using SSR for the appropriate one of the client resource rating values applicable to the client device. From block 704, method 700 continues to block 705. At block 705, the webserver is configured to preserve the mapping of the client resources to the appropriate one of the client resource rating values within the webserver context. Such preservation can continue even when a client session is expired. By maintaining persistence of client mapping information within webserver context even when client session is expired, re-building of the same information for the client device can be avoided, which can be particularly beneficial if the client device makes frequent requests to the webserver.

From block 705, method 700 continues to block 706. At block 706, a schedule purging interval is assigned at the webserver for the mapping of client resources to the appropriate one of the client resource rating values. From block 706, method 700 continues to block 707. At block 707, the mapping of client resources to the appropriate one of the client resource rating values within the webserver is purged upon expiration of the schedule purging interval. A schedule purging interval of client information can be assigned within the webserver context as a period of time, such as one day. An initial default value for the period of time may be modified later as convenient, and the schedule purging interval can be a configurable parameter. As various examples, a schedule purging interval could be selected to be one day, one week, one month, or a different period of time. If client information is purged at a configured time, the webserver can build again the client information when the same client eventually re-establishes communication at a later point in time. On another note, numbers and types of client resources represented in a six-point scale table is an example of a rated scale of client resource rating values. Actual details may differ in various implementations.

FIG. 8 shows a sub-method for implementing block 703 of method 700 according to an embodiment of the present disclosure. Method 800 begins at block 801 and continues to block 802. At block 802, a webserver authenticates and authorizes a client device to issue a token once after successful client validation. From block 802, method 800 continues to block 803. At block 803, the webserver issues a token to the client device and a request for its resource type(s). In accordance with at least one embodiment, the issuance of the token and the request for the resource type or types is combined within the same response. An example of resource type parameters are the parameters shown in column 321 of FIG. 3 (e.g., computing capabilities, memory capabilities, network capabilities, graphics capabilities, operating system (OS) and application software (app) capabilities, browser capabilities, etc.) From block 803, method 800 continues to block 804. At block 804, the webserver receives the resource type response from the client device. In accordance with at least one embodiment, the webserver sends an acknowledgement to the receipt of the resource type response from the client device. From block 804, method 800 continues to block 805. At block 805, the webserver performs a mapping of client resources to an appropriate one of the client resource rating values. From block 805, method 800 continues to block 806. At block 806, the webserver retains the mapping of the client resources to the appropriate one of the client resource rating values within a webserver context.

Figure 9:
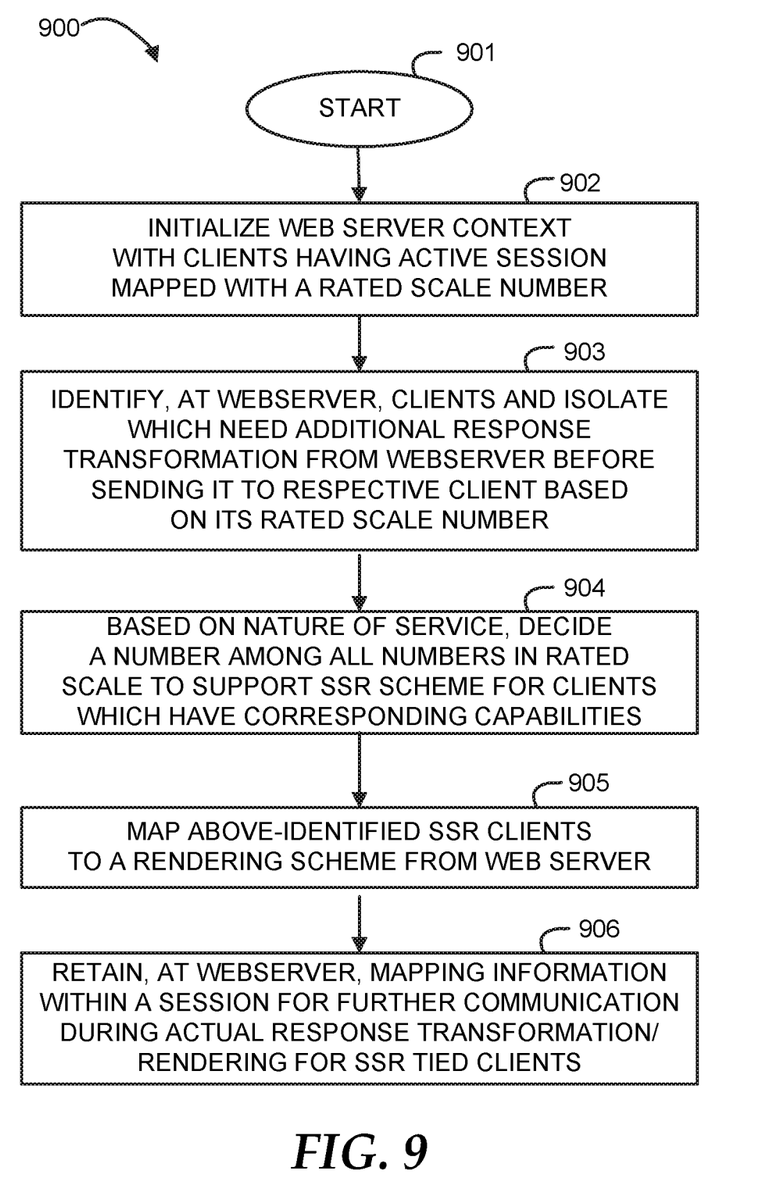
FIG. 9 is a flow diagram illustrating a sub-method for implementing block 603 of method 600 according to an embodiment of the present disclosure.

FIG. 9 shows a sub-method for implementing block 603 of method 600 according to an embodiment of the present disclosure. By identifying SSR-approach-tied client devices and associating them with appropriate rendering scheme, SSR transformed content can be optimized for the characteristics of each particular client device participating in the exchange of such characteristics with a webserver. Method 900 begins at block 901 and continues to block 902. At block 902, a webserver initializes its webserver context with clients having a respective active session mapped with a rated scale number. From block 902, method 900 continues to block 903. At block 903, the webserver identifies and isolates clients which would benefit from additional response transformation from the webserver before sending content from the webserver to a respective client based on its rated scale number. For example, for a client device rated as "1-Very Low" in its capabilities by relatively matching its resource types, the webserver will automatically perform SSR in a transformed manner most suitable for that client device. From block 903, method 900 continues to block 904. At block 904, based on a nature of service, the webserver decides a number among all numbers in the rated scale to support an SSR scheme for clients which have corresponding capabilities. If a level of capability of a webserver to provide transformed SSR content changes, the webserver may adjust the client resource rating values or the amount of transformation to be provided for particular client resource rating values.

Client devices identified by the webserver as not requiring SSR (such as being placed in a No-SSR category) can be provided untransformed content, which need not include SSR. From block 904, method 900 continues to block 905. At block 905, the webserver maps above-identified SSR clients to a rendering scheme. For example, a client with associated with a number "1-Very Low" client resource rating value can be mapped to a "FULL-CONTENT-TRANSFORMATION" rendering scheme. From block 905, method 900 continues to block 906. At block 906, the webserver retains the mapping information within a session for further communication during actual response transformation/rendering for SSR-tied clients.

Figure 10:
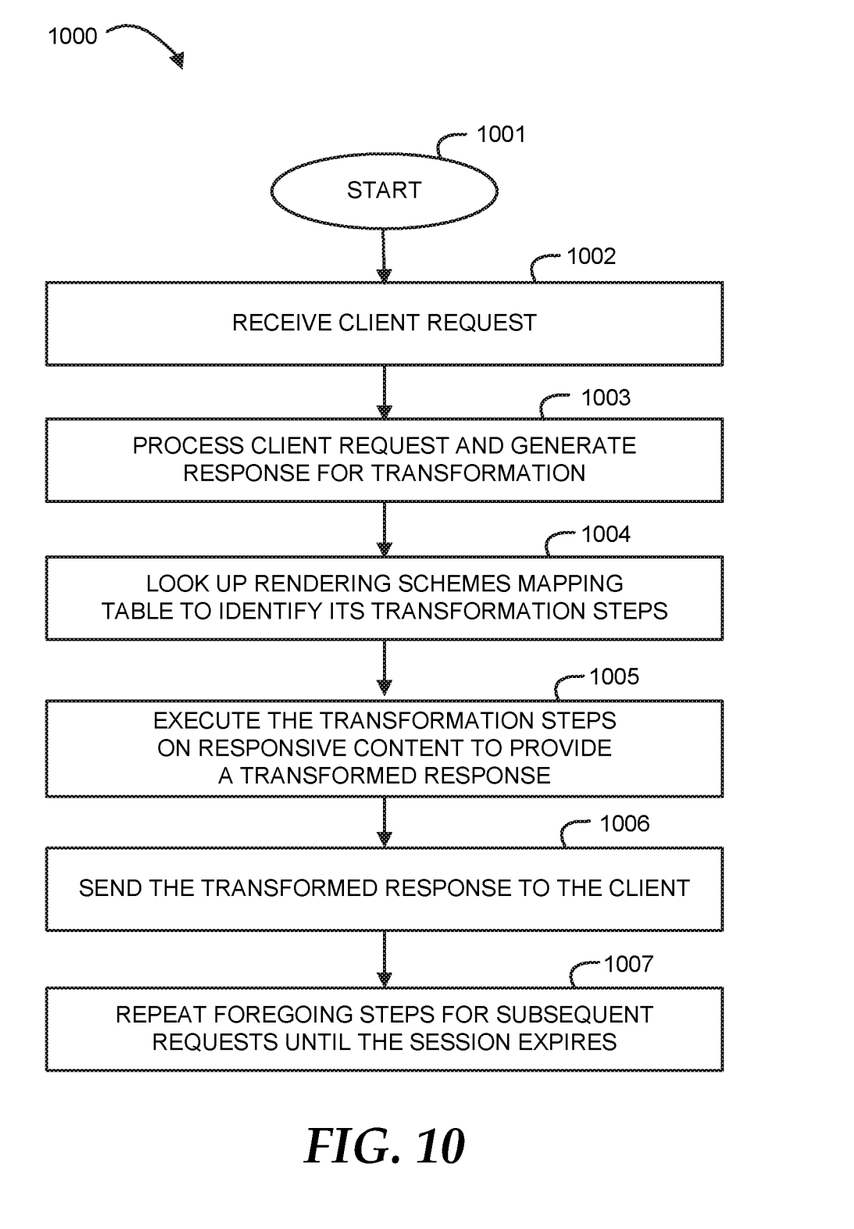
FIG. 10 is a flow diagram illustrating a sub-method for implementing block 604 of method 600 according to an embodiment of the present disclosure.

FIG. 10 shows a sub-method for implementing block 604 of method 600 according to an embodiment of the present disclosure. In accordance with at least one embodiment, a webserver performs rendering and transformation action defined for each SSR-tied client whenever there is a request-response exchange during the client's active session period. According to method 1000, adaptive SSR from hosted service can be performed for client devices of various capabilities. Method 1000 begins at block 1001 and continues at block 1002. At block 1002, a webserver receives a client request from a client device. From block 1002, method 1000 continues to block 1003. At block 1003, the webserver processes the client request and generates a response to be transformed by the webserver according to an appropriate transformation. From block 1003, method 1000 continues at block 1004. At block 1004, the webserver performs a look-up operation in its rendering schemes mapping table to identify its transformation steps. From block 1004, method 1000 continues to block 1005. At block 1005, the web server executes the transformation steps on responsive content to provide a transformed response. From block 1005, method 1000 continues at block 1006. At block 1006, the webserver sends the transformed response to the client device. From block 1006, method 1000 continues to block 1007. At block 1007, the webserver completes the foregoing operations, as described, for example, in blocks 1002 through 1006, for subsequent requests until the session of the client device with the webserver expires.

In accordance with at least one embodiment, seamless and adaptive SSR can be provided in a client-server architecture by considering client-side configurations and capabilities. An auto-mode switching approach can be used to perform or skip SSR at server side while considering a rated scale mapping for clients along with its rendering scheme for response transformation. Identification and filtering of client devices based on their response rendering capabilities and configurations can be used to apply SSR schemes. In accordance with at least one embodiment, a webserver can improve application performance and speed up user interface (UI) rendering for delivering server content, which can include, for example, system management content useful for managing information handling systems.

In accordance with at least one embodiment, a webserver can perform client configuration and capability validation using a rated scale to measure the level of transformation/rendering required in response and can perform rendering accordingly from server side, which improves solution adoption and scalability. Retention, within a webserver context, of information indicating an appropriate one of client resource rating values for a particular client device for a limited time following an initial access of the client device to the webserver, with scheduled purging of such information, can be used to limit the volume of information retained to information likely to be useful, thereby improving scalability of the system. For example, in a situation where many client devices infrequently access a webserver, information can be selectively retained for a subset of those many client devices that has recently accessed the webserver.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a processor;
   a memory coupled to the processor; and
   a network interface coupled to the processor, the network interface configured to be coupled to a client device over a network, the processor configured to receive a report of client capabilities pertinent to client rendering at the client device received from the client device via the network interface, to assign a client resource rating to the client device from among a pre-defined plurality of client resource ratings, to store the client resource rating of the client device and an identifier of the client device in a data structure in the memory, to look up the client resource rating of the client device in the data structure, to transform content to be provided to the client device into server-side rendering (SSR) transformed content according to the client resource rating of the client device, and to provide the SSR transformed content to the client device via the network interface.

2. The information handling system of claim 1, wherein the report of client capabilities describes a processing capability of a client processor of the client device and a memory capability of a client memory of the client device.

3. The information handling system of claim 2, wherein the report of client capabilities further describes a network capability of a client network interface of the client device.

4. The information handling system of claim 1, wherein the processor is further configured to retain the client resource rating of the client device in the data structure in the memory after a client session with the client device has ended.

5. The information handling system of claim 4, wherein the processor is further configured to purge the client resource rating of the client device from the data structure according to a purging schedule.

6. The information handling system of claim 5, wherein the processor is configured, for a subsequent client session prior to the purging of the client resource rating of the client device from the data structure, to again look up the client resource rating of the client device in the data structure, to transform subsequent content to be provided to the client device into subsequent SSR transformed content according to the client resource rating of the client device, and to provide the subsequent SSR transformed content to the client device.

7. The information handling system of claim 1, wherein transformation of content into SSR transformed content comprises transformation of content comprising an element selected from a group consisting of a graphics rendering language, a scripting language, and an extensible markup language.

8. A method comprising:
receiving, by a processor, a report of client capabilities pertinent to client rendering at the client device received from the client device via a network interface coupled to the processor;
assigning, by the processor, a client resource rating to the client device from among a pre-defined plurality of client resource ratings;
storing, by the processor, the client resource rating of the client device and an identifier of the client device in a data structure in a memory;
looking up, by the processor, the client resource rating of the client device in the data structure;
transforming, by the processor, content to be provided to the client device into server-side rendering (SSR) transformed content according to the client resource rating of the client device; and
providing, by the processor, the SSR transformed content to the client device.

9. The method of claim 8, wherein the report of client capabilities describes a processing capability of a client processor of the client device and a memory capability of a client memory of the client device.

10. The method of claim 9, wherein the report of client capabilities further describes a network capability of a client network interface of the client device.

11. The method of claim 8, further comprising:
retaining the client resource rating of the client device in the data structure in the memory after a client session with the client device has ended.

12. The method of claim 11, further comprising:
purging the client resource rating of the client device from the data structure according to a purging schedule.

13. The method of claim 12, further comprising, for a subsequent client session prior to the purging of the client resource rating of the client device from the data structure:
again looking up the client resource rating of the client device in the data structure;
transforming subsequent content to be provided to the client device into subsequent SSR transformed content according to the client resource rating of the client device; and
providing the subsequent SSR transformed content to the client device.

14. The method of claim 8, wherein the transforming the content into the SSR transformed content comprises transforming the content comprising an element selected from a group consisting of a graphics rendering language, a scripting language, and an extensible markup language.

15. An information handling system comprising:
a processor; and
a memory coupled to the processor, the processor configured to be in communication with a client device over a network, the processor configured to receive a report of client capabilities pertinent to client rendering at the client device, to assign a client resource rating to the client device from among a pre-defined plurality of client resource ratings, to store the client resource rating of the client device and an identifier of the client device in a data structure in the memory, to look up the client resource rating of the client device in the data structure, and to transform content to be provided to the client device into server-side rendering (SSR) transformed content according to the client resource rating of the client device, and to provide the SSR transformed content to the client device.

16. The information handling system of claim 15, wherein the report of client capabilities describes a processing capability of a client processor of the client device and a memory capability of a client memory of the client device.

17. The information handling system of claim 16, wherein the report of client capabilities further describes a network capability of a client network interface of the client device.

18. The information handling system of claim 15, wherein the processor is further configured to retain the client resource rating of the client device in the data structure in the memory after a client session with the client device has ended.

19. The information handling system of claim 18, wherein the processor is further configured to purge the client resource rating of the client device from the data structure according to a purging schedule.

20. The information handling system of claim 19, wherein the processor is configured, for a subsequent client session prior to the purging of the client resource rating of the client device from the data structure, to again look up the client resource rating of the client device in the data structure, to transform subsequent content to be provided to the client device into subsequent SSR transformed content according to the client resource rating of the client device, and to provide the subsequent SSR transformed content to the client device.

\* \* \* \* \*